United States Patent Office 2,826,162
Patented Mar. 11, 1958

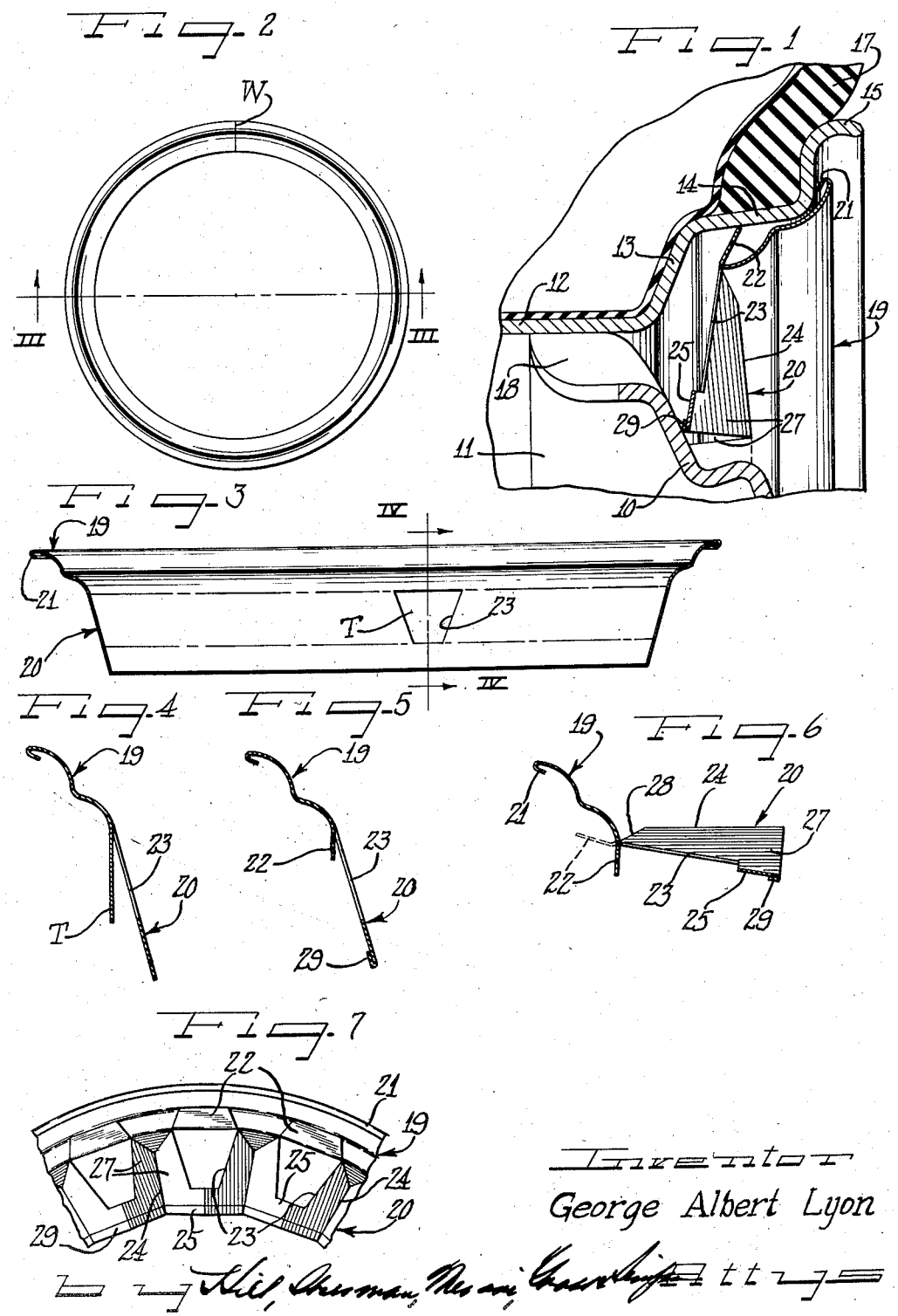

2,826,162

METHOD OF MAKING WHEEL STRUCTURES

George Albert Lyon, Detroit, Mich.

Application October 22, 1953, Serial No. 387,610

7 Claims. (Cl. 113—116)

The present invention relates to improvements in manufacture of wheel structures and more particularly concerns the novel method of making trim rings to be hereinafter more fully described.

An important object of the present invention is to provide improvements in the making of wheel structures and more particularly trim rings.

Another object of the invention is to provide a novel method of making trim rings wherein there is provided a rigid annular portion and a flexible annular portion on the trim ring.

A further object of the invention is to provide a novel method of making trim rings from strip material.

Still another object of the invention is to provide a novel method of making trim rings of the self-retaining type having rigid annular and connected flexible annular portions.

Other objects, features and advantages of the present invention will be readily apparent from the following detailed description of a preferred embodiment thereof taken in conjunction with the accompanying drawings, in which:

Figure 1 is a fragmentary radial sectional view through a vehicle wheel structure showing a trim ring made according to the present method applied to the wheel;

Figure 2 is a plan view of an annular trim ring blank;

Figure 3 is an enlarged diametrical sectional view through the trim ring blank taken substantially on the line III—III of Figure 2 and showing the same following an additional step in the method;

Figure 4 is a transverse sectional view taken substantially on the line IV—IV of Figure 3;

Figure 5 is a sectional view similar to Figure 4 but showing the structure following additional steps in the method;

Figure 6 is a sectional view similar to Figures 4 and 5 but showing the structure following further operations thereon; and Figure 7 is a fragmentary rear plan view of the trim ring following completion thereof.

A wheel with which a trim ring according to the present invention is adapted to be used comprises a wheel body 10 which may be of the disk spider type having a marginal generally axially extending attachment flange 11 secured in suitable manner to a base flange 12 of a multi-flange, drop-center tire rim including a side flange 13 extending angularly generally radially outwardly from the outer side of the base flange and merging with an intermediate generally axially and radially outwardly extending flange 14 joining an intermediate flange 15. The flange structure of the tire rim is adapted to support a pneumatic tire and tube assembly 17. At juncture with the tire rim, the wheel body 10 preferably is provided with wheel openings 18 which may be from three to five in number and provided by inset portions of the attachment flange 11.

A trim ring made according to the present invention for application to the outer side of the wheel, comprises an outer annular portion 19 adapted to overlie the tire rim, and an inner annular portion 20 angularly related to the outer annular portion and adapted to overlie the wheel body 10 adjacent to the tire rim. The outer annular portion 19 is preferably of substantially rigid construction and for this purpose is of an annularly ribbed formation having its outer edge turned under to provide a reinforcing and finishing bead 21 of a diameter to overlie the terminal flange 15 of the wheel. From the reinforcing underturned flange 21 the outer annular portion 19 extends generally axially and radially inwardly to extend past the juncture shoulder of the intermediate and terminal flanges of the tire rim and to extend to a substantial distance toward the side flange 13 of the tire rim but spaced therefrom in assembly.

Means for securing the trim ring to the wheel comprise a series of generally radially outwardly extending and axially outwardly oblique retaining fingers 22 formed on the inner margin of the outer annular portion 19 of the trim ring and engageable retainingly at their tips with the intermediate flange 14 of the tire rim.

The inner annular portion 20 of the trim ring is constructed to extend angularly generally radially inwardly from the inner margin of the outer annular portion 19 of the trim ring and is provided with a spaced annular series of apertures 23 disposed opposite the wheel openings 18 and thereby enabling air circulation through the wheel openings and the overlying trim ring. The material derived from the openings 23 is utilized in providing the retaining fingers 22.

Intermediate the apertures 23, the inner annular portion 20 is of generally corrugated construction, providing a symmetrical series of generally radially extending humped ribs 24 joined together at their inner end portions by a series of connecting webs 25 closing the inner ends of the apertures 23. In the present instance the ribs 24 are of sharp ridged structure providing respective diverging side panels 27 which are wider at their radially inner ends than at their radially outer ends in generally inverse relation to the proportions of the apertures 23 intervening between the ribs, as best seen in Fig. 7. The apertures 23 are narrowest at their radially inner ends and widest at their radially outer ends, thus affording maximum width for the base or juncture portions of the retaining fingers 22 with the fingers tapering toward their tips.

In order to render the radially inner portion 20 of the trim ring flexible relative to the radially outer portion 19, the outer ends of the ribs 24 are tapered off toward juncture with the inner margin of the outer annular portion, thus providing outer end panels 28 on the ribs. As a result, when the trim ring is applied to the wheel, the inner edge defining the inner marginal portion 20 of the trim ring is engageable under resilient tension against the wheel body 10. The resilient connection of the ends of the ribs 24 with the inner margin of the outer annular portion 19 of the trim ring enables axial flexing of the inner annular portion 20, while the generally radially corrugated construction of the inner marginal portion of the trim ring provides for peripheral contraction and expansion thereof incident to axial flexure.

Enhanced resilience of the inner edge of the inner annular portion 20 of the trim ring is afforded by an underturned inner extremity reinforcing and finishing flange 29 which preferably runs continuously about the entire inner periphery of the inner annular trim ring portion.

In an efficient and economical method of making the trim ring, it is produced from strip material such as stainless steel or brass or the like which is initially rolled into a section substantially as shown in Fig. 3 and fashioned into annular form as shown in Fig. 2 with the ends of the strip section joined at W as by welding or brazing and then finished off so that the joint is concealed from the front of the annulus. At the completion of the rolling and end joining steps of the method, the outer annular portion 19 of the trim ring is completed as to cross-section and is provided with the outer edge underturned bead-like flange 21. On the other hand, the inner annular section or portion 20 of the trim ring at this time comprises a generally frusto-conical inwardly tapering section as shown in Fig. 3. In this condition of the ring it is readily subjected to polishing and buffing and burnishing to provide the same with a highly lustrous finish on the outer surface thereof.

After the polishing operation, the apertures 23 are punched in the inner annular section 20 of the trim ring blank by severing tongues of material T (Figs. 3 and 4) along generally convergently-related side lines and an inner connecting line, while the outer end of the tongue remains integrally connected with the inner margin of the outer annular section 19 of the trim ring.

In the next step of the method, the tongues T are trimmed off to shorten the same and provide proper length for the retaining fingers 22. At this time, also, the inner edge of the inner section 20 of the blank may be turned under to provide the reinforcing and finishing flange 29. This is illustrated in Fig. 5.

Thereafter, the inner section 20 is subjected to a corrugating bending operation which is preferably accomplished in a suitable corrugating die apparatus such as in a punch press. This shapes the inner section 20 as shown in Fig. 6, deflecting the inner section 20 out of the frusto-conical condition thereof into generally radially inwardly directed angular relation to the outer annular section 19 of the trim ring. At this time, also, the outer end panels 28 are formed on the ribs 24. As will be observed on comparison of Figures 3, 5 and 6, bending of the inner section 20 is effected along a circular line generally coincident with the axially outer ends of the openings 23 and the base ends of the finger-forming tongues 22. As the section 20 is bent generally radially inwardly the portions thereof intermediate the openings 23 are bent up axially relative to the portions of the section 20 at the inner ends of the openings or apertures 23 and comprising the connecting webs 25. That is, the ribs 24 are bent up generally axially outwardly and extending generally radially inwardly while the connecting webs 25 are creased, as best seen in Fig. 7 to project generally axially inwardly between the ribs. Through this arrangement, the shinkage in a circumferential sense that necessarily occurs in bending up the originally generally frusto-conical section 20 into generally radially inwardly extending condition, is accommodated. No particular die structure has been shown to accomplish this, since it can be done by hand manipulation of the material of the section 20. Corrugating apparatus suitable for this purpose may comprise complementary die members having generally the shape of the ridge rib portions 24 and the faces 28, and other die members complementary thereto for forming the sides 27 and the creased connecting webs 25.

Incidental to the corrugating operation or immediately following the same, the retaining fingers 22 are bent from the generally axially extending condition thereof as shown in full outline in Fig. 6 into the angular generally radially outwardly and axially outwardly oblique condition of the final form as shown in dash outline in Fig. 6 and in full outline in Figs. 1 and 7.

Following completion of the forming steps of the trim ring, it may be plated if desired.

It will be understood that modifications and variations may be effected without departing from the scope of the novel concepts of the present invention.

I claim as my invention:

1. In a method of making a trim ring, shaping a piece of sheet metal into annular form with a substantially rigid annularly ribbed outer section and a generally frusto-conical inner section, and then generally radially corrugating the inner section and bending said inner section into angular generally radially inwardly directed relation to said outer section.

2. In a method of making a trim ring, the steps of rolling a strip of sheet metal into a section comprising a substantially rigid portion and a substantially flat sectioned portion sloping from the rigid portion, shaping the strip into an annulus and joining the ends of the annulus permanently together, to provide a continuous ring, with the sloping portion at the inside of the ring, and generally radially corrugating the sloping portion along transverse or radial lines and bending such sloping portion into angular generally radially inwardly directed relation to the rigid portion of the ring.

3. In a method of making a trim ring, the steps of shaping a piece of sheet metal into a ring with an outer annularly ribbed portion and an inner generally inwardly sloping annular portion extending as a continuation of the inner margin of the outer annular portion, punching a series of openings in said inner annular portion with the material punched from the openings extending as tongues integral with said outer annular portion, and transversely ribbing said inner annular portion intermediate the apertures and bending the inner annular portion into angular generally radially inwardly directed relation to the outer annular portion and said tongues.

4. In a method according to claim 3, including the additional step of trimming said tongues to a shorter condition preceding the ribbing and angular bending of the inner annular portion.

5. In a method according to claim 3, including the step of turning the inner edge of the inner annular portion upon itself to provide a reinforcing and finishing return bent flange prior to ribbing and angularly bending said inner annular portion.

6. A method according to claim 3, including the steps of trimming said tongues prior to ribbing and bending said inner annular section to provide retaining finger extensions, and following the ribbing and bending of the inner annular section bending said retaining fingers angularly behind said outer annular portion in a direction away from said inner annular portion.

7. In a method of making a trim ring from sheet metal, the steps of shaping a piece of sheet metal into an annular body with an outer annularly ribbed portion and an inner annular generally frusto-conical portion, buffing and polishing the outer surface of said annular portions, punching retaining fingers from said inner annular portion, and transversely ribbing said inner annular portion and bending the same generally radially inwardly angularly relative to said retaining fingers and said outer annular portion, and thereafter plating the ring.

References Cited in the file of this patent

UNITED STATES PATENTS

| | | |
|---|---|---|
| 464,403 | Turpin | Dec. 1, 1891 |
| 2,001,553 | Spencer | May 14, 1935 |
| 2,368,229 | Lyon | Jan. 30, 1945 |
| 2,493,002 | Lyon | Jan. 3, 1950 |
| 2,600,411 | Lyon | June 17, 1952 |
| 2,609,780 | Whitbeck | Sept. 9, 1952 |